United States Patent [19]

Crasnianski

[11] Patent Number: 4,864,354

[45] Date of Patent: Sep. 5, 1989

[54] INTEGRATED AUTOMATIC MACHINE FOR SIMULTANEOUSLY AND CONTINUOUSLY EFFECTING THE DEVELOPMENT OF PHOTOGRAPHIC FILMS AND THE PRINTING AND DEVELOPMENT OF PHOTOGRAPHIC PRINTS

[76] Inventor: Serge Crasnianski, 11 chemin des Buisses, 38240 Meylan, France

[21] Appl. No.: 202,516

[22] Filed: Jun. 6, 1988

[30] Foreign Application Priority Data

Jun. 16, 1987 [FR] France ............................... 87 08680

[51] Int. Cl.$^4$ ........................ G03B 27/32; G03B 27/52
[52] U.S. Cl. ....................................... 355/27; 355/28; 354/316; 354/322
[58] Field of Search ................................... 355/27, 28; 354/312–314, 316, 319–321, 322

[56] References Cited

U.S. PATENT DOCUMENTS

| | | | |
|---|---|---|---|
| 4,185,912 | 1/1980 | Schwartz | 355/28 |
| 4,410,257 | 10/1983 | Thebault | 354/313 |
| 4,451,141 | 5/1984 | Thebault | 355/28 |

FOREIGN PATENT DOCUMENTS

| | | |
|---|---|---|
| 314137 | 9/1919 | Fed. Rep. of Germany . |
| 584096 | 9/1933 | Fed. Rep. of Germany . |
| 330550 | 6/1930 | United Kingdom . |

Primary Examiner—L. T. Hix
Assistant Examiner—D. Rutledge
Attorney, Agent, or Firm—Arnold, White & Durkee

[57] ABSTRACT

Integrated automatic machine for simultaneously and continuously effecting the development of photographic films F and the printing and development of photographic prints E, in a single casing.

According to the invention, the film development section H of the negative developing unit A and paper development section G of the printing unit B are disposed side by side. The exposure section C of the printing unit B is divided in two parts disposed on two said sections C and H, the image to be reproduced being reflected by mirrors.

6 Claims, 9 Drawing Sheets

INTEGRATED AUTOMATIC MACHINE FOR SIMULTANEOUSLY AND CONTINUOUSLY EFFECTING THE DEVELOPMENT OF PHOTOGRAPHIC FILMS AND THE PRINTING AND DEVELOPMENT OF PHOTOGRAPHIC PRINTS

BACKGROUND

The invention relates to a new integrated automatic machine for simultaneously and continuously effecting the development of photographic films and the printing and development of photographic prints.

As is known, a "film development unit" comprises essentially a film development section, also known as a "negative development section", consisting of a plurality of successive chemical treatment tanks through which the negative film to be developed passes, and a developed film drying zone.

Similarly, a "printing and development unit for photographic prints" comprises essentially:

firstly, an exposure section consisting of a lamp, a filter system, a negative carrier, a lens and an exposure surface, the whole arrangement being aligned on an optical path;

a paper feed section comprising a packet of photosensitive paper, means for feeding the paper to the exposure surface onto which the image to be printed, coming from the lens, is projected, and a device for cutting the exposed paper;

an exposed paper development section, also known as a "paper development section", comprising a plurality of successive chemical treatment tanks, and a photographic print drying zone.

Up to the present time these two units are generally separate (see for example European Patents EP-A-0064015 and 0062593 and the respective corresponding American Patents US-A-4 451 141 and 4 410 257). In the Patent US-A-4 185 912 it has been suggested to combine these two units in a single casing, so as to form a compact automatic arrangement intended to permit continuous development of films and also development of photographic prints. In this arrangement the film is first conveyed through the successive tanks of the film development section by means of an adhesive belt, which brings it to the exposure section to which the photosensitive paper is also brought. The two development units for film and paper are separate and superposed, so that the whole arrangement is complex and bulky. The operation of this machine entails numerous manipulations and gives rise to certain difficulties, particularly in the exposure stage and especially in connection with the synchronizing of the developed film and the paper which is to be exposed. Finally, this machine makes it necessary to employ careful and even skilled personnel.

BRIEF SUMMARY OF THE INVENTION

The invention obviates these disadvantages. It relates to an integrated automatic machine comprising the two units of the type in question, combined in a single casing, and which will be automatic, economical, and easy to operate and will permit the advantageous treatment of a single size of film and paper, thus being highly specialized, particularly for the size known as "135" or any other standard size.

The invention also relates to an automatic machine of the type in question, which is compact and easy to work, even with unskilled personnel.

This integrated automatic machine for simultaneously and continuously effecting the development of photographic films and also the printing and development of photographic prints, of the type comprising in a single casing:

a unit A for developing negative films, consisting of a film development section H comprising a plurality of successive chemical treatment tanks through which the negative film F advances, and a drying zone for the developed film F';

a printing and development unit B for photographic prints E, comprising:

an exposure section C, comprising a lamp, a filter system, a negative carrier and a lens;

a paper feed section D comprising a packet of photosensitive paper P, a means bringing the paper to an exposure surface onto which the image to be reproduced, coming from the lens, is projected, and a means for cutting the exposed paper P';

a development section G for the exposed paper P', comprising a plurality of successive chemical treatment tanks, and a zone for drying the resulting photographic print E, is characterized according to the invention:

on the one hand in that the film development section H and the print development section G are disposed side by side, so that some of the chemical treatment tanks and the drying zones are disposed side by side in separate compartments;

on the other hand in that the exposure section C of the printing unit B is disposed in the dark above the film development section H, while the paper feed section P following it is disposed above the paper development section G, in addition, in that the developed film F' passes out in the dark from the development unit A to penetrate directly into the negative carrier of the exposure section C disposed above the film development section A;

and finally in that the image to be reproduced, coming from the lens disposed after the negative carrier, is received by a first mirror disposed in the exposure section C above the film development section H, and is then transmitted by reflection to a second mirror parallel to the first but disposed above the paper development section G, to bring this image onto the exposure surface of the paper feed section D.

In other words, the invention consists in having the two development units, for film and paper respectively, disposed side by side in a single casing, so that the essential part of the chemical treatment tanks and the drying section coincide, and then in having disposed the outlet of the film development unit in a darkroom forming an exposure section and in disposing in this exposure section an optical arrangement enabling the image of the developed film to be projected onto the photosensitive paper on the exposure surface with the aid of a set of mirrors reflecting it into a different plane.

In practice, it is advantageous:

for the drying zone and at least one washing tank of the two development sections for film and paper respectively to be common to the two units A and B;

for the guide system for the film F in the development unit A to be composed of two parallel guide rails provided with respective grooves facing one another in the same plane and spaced apart by a distance equal to the width of the film to be developed, the film F being transported in the development section H of, the unit A by means of successive pairs o motorized rollers, at least one of the rollers having at both ends an 0-ring seal disposed facing and pressing against the other roller, in such a manner as to grip, outside the exposed zone, the film F which is to be transported;

for the exposure section C in the dark to comprise:
a first module disposed above the film development unit A, consisting of:
an exposure lamp,
a filter system,
a diffusing system,
the outlet end of the two developed film guide rails forming a negative carrier,
a set of drive rollers intended for driving the film which is to be exposed,
a lens,
a first mirror inclined at 45°, intended for reflecting the image of the film to be reproduced,
a second module disposed above the paper development section G, consisting of a second mirror parallel to the first and intended for reflecting the image to be reproduced onto the exposure surface;
for the developed film outlet zone of the development unit A, penetrating into the exposure section C and forming the negative carrier, to comprise:
an orthogonal exposure window centered on the optical path and disposed in the plane situated in line with the two guide rails;
system driving the film F' to be exposed;
a portion disposed just upstream of this outlet zone, in which the rails are interrupted on at least one side, in such a manner as to form, taking advantage of the flexibility of the film, an accumulation zone for the developed film F' which advances continuously, while the image being exposed is stationary;
for the drive system for the developed film F' which is to be exposed to comprise three pairs of synchronously driven pressure rollers whose planes of tangency are in alignment, the first and the second pairs defining a zone disposed just upstream of the exposure window and intended to receive the negative film analysis system, while the second and third pairs are disposed on the optical path, facing said exposure window to form negative carriers.

BRIEF DESCRIPTION OF THE DRAWINGS

The manner in which the invention can be put into practice and the advantages which it provides will emerge more clearly from the example of embodiment given below, by way of indication and without constituting a limitation, with reference to the accompanying drawings.

DETAILED DESCRIPTION

Figure 3:
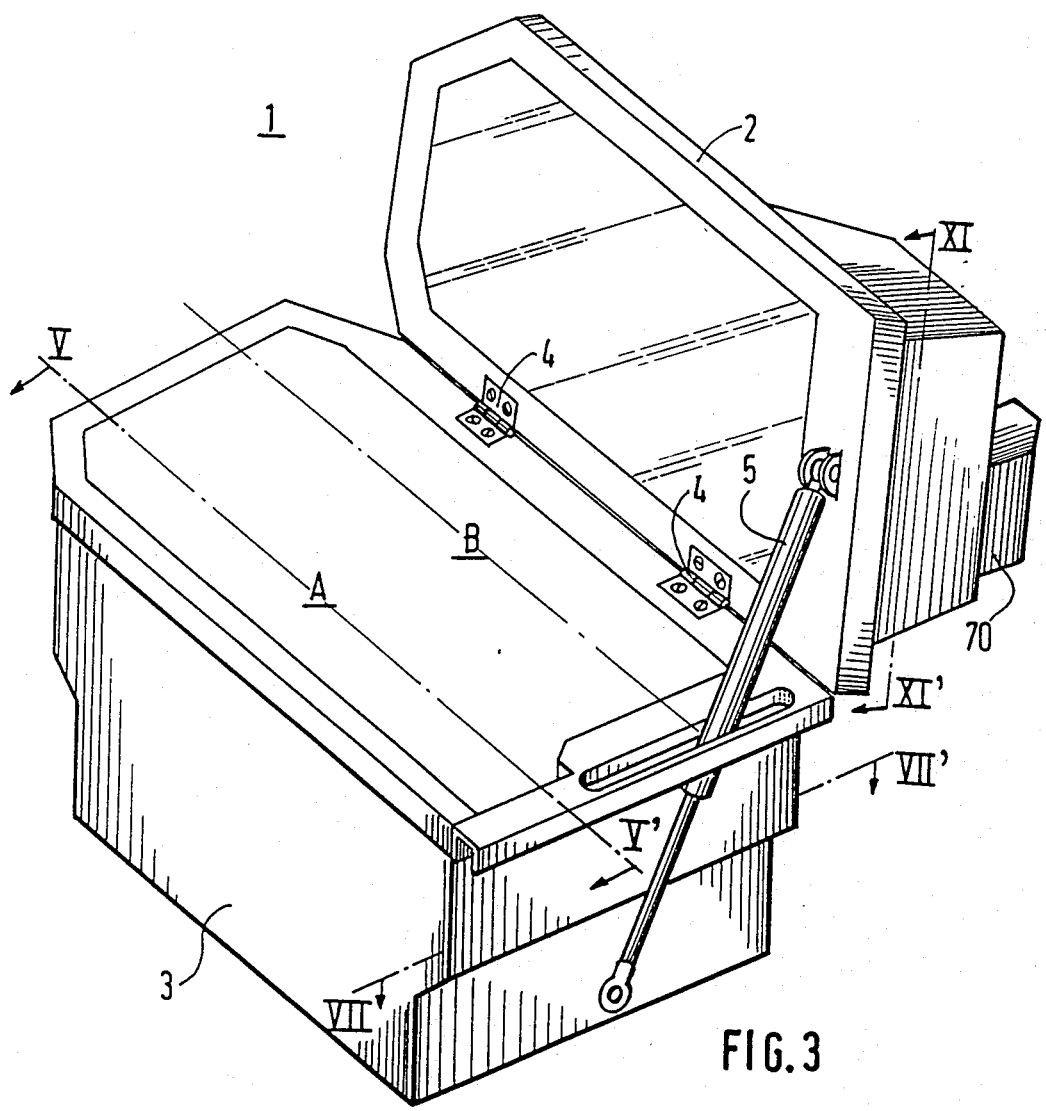
FIG. 3 is a summary perspective view of the machine according to the invention, shown in the open position.

The integrated automatic machine for simultaneously and continuously effecting the development of photographic films F and also the printing and development of photographic prints E according to the invention is enclosed in a single rigid casing given the general reference 1. This casing 1 is advantageously made of molded plastics material withstanding the conditions of use, for example of polyphenylene oxide. This casing 1 essentially comprises two separate parts, namely a lid 2 and a container 3 which are articulated together on the side by hinges 4, and the closing movement of which is assisted by a ram 5 (FIG. 3).

Referring to FIGS. 1 to 4, this machine comprises firstly a hinged lid 10 intended for the insertion into a cradle 12 of the spool 11 of negative film to be developed. The end of the film given the general reference F is introduced between a pair of engagement rollers 13, 14 operated manually from the outside or automatically. The film F is then taken over by a pair of motorized rollers 15, 16. A cutter 17 (see FIG. 4) disposed before the two pairs of rollers 13, 14 and 15, 16 cuts the end of the film F when the latter has been completely unwound.

Figure 2:
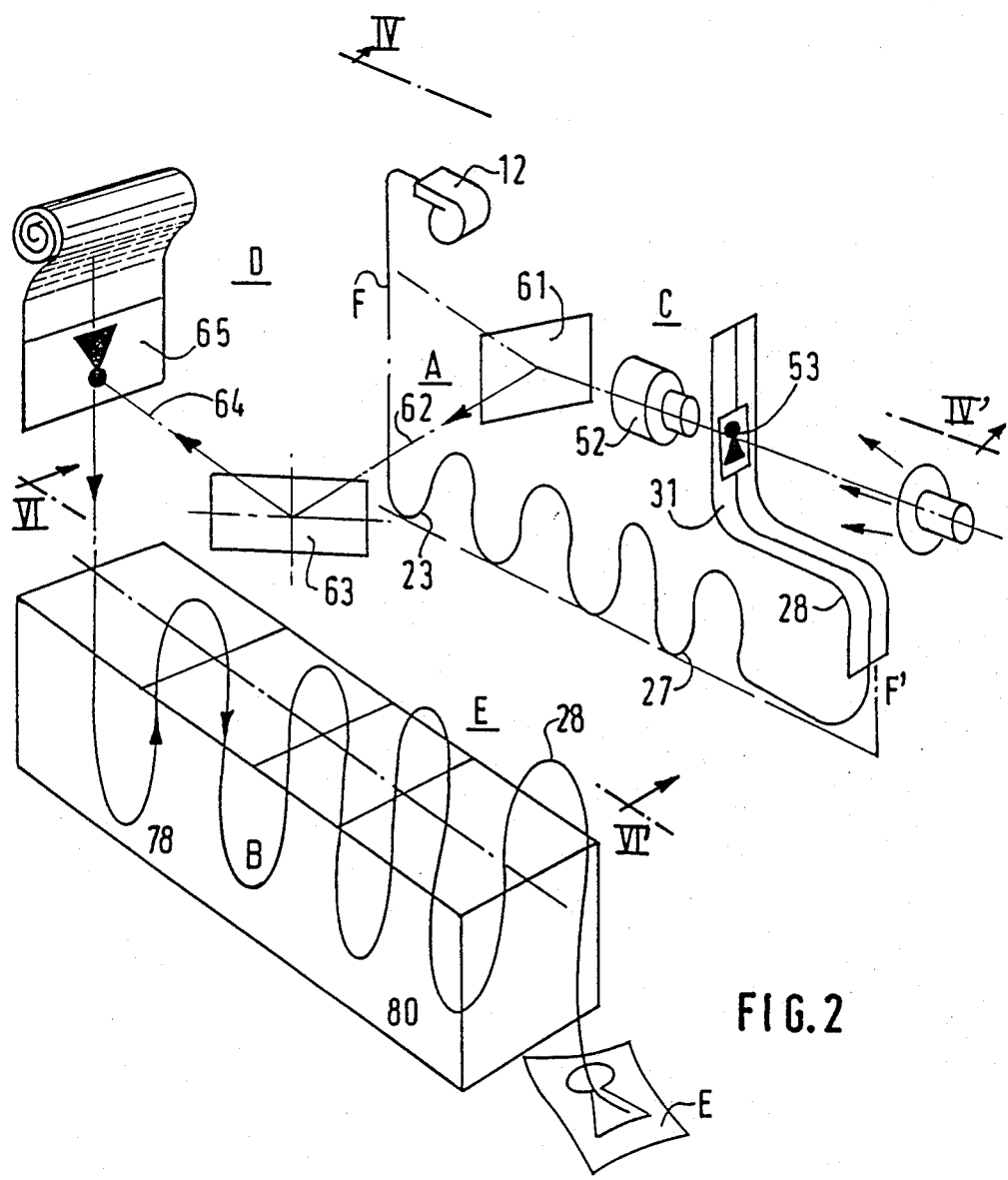
FIG. 2 is a summary schematic representation of the arrangement, characteristic of the invention, of the different sections of the two units A and B.
Figure 4:
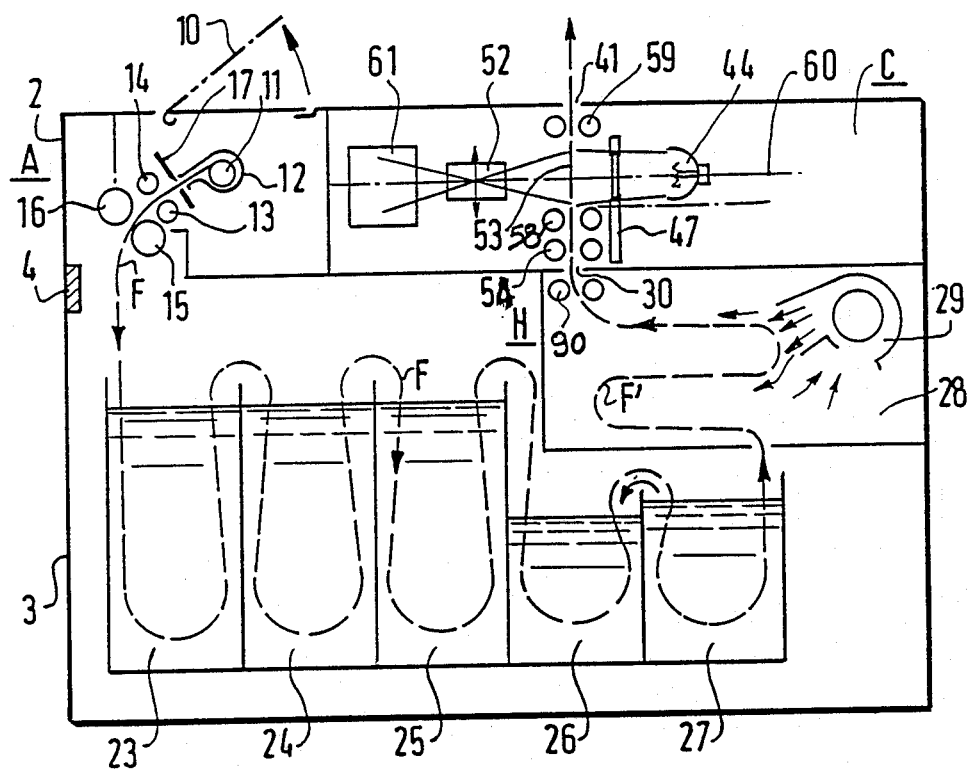
FIG. 4 is a view in longitudinal section of the film development unit A, taken on the axis IV—IV' in FIG. 2.
Figure 5:
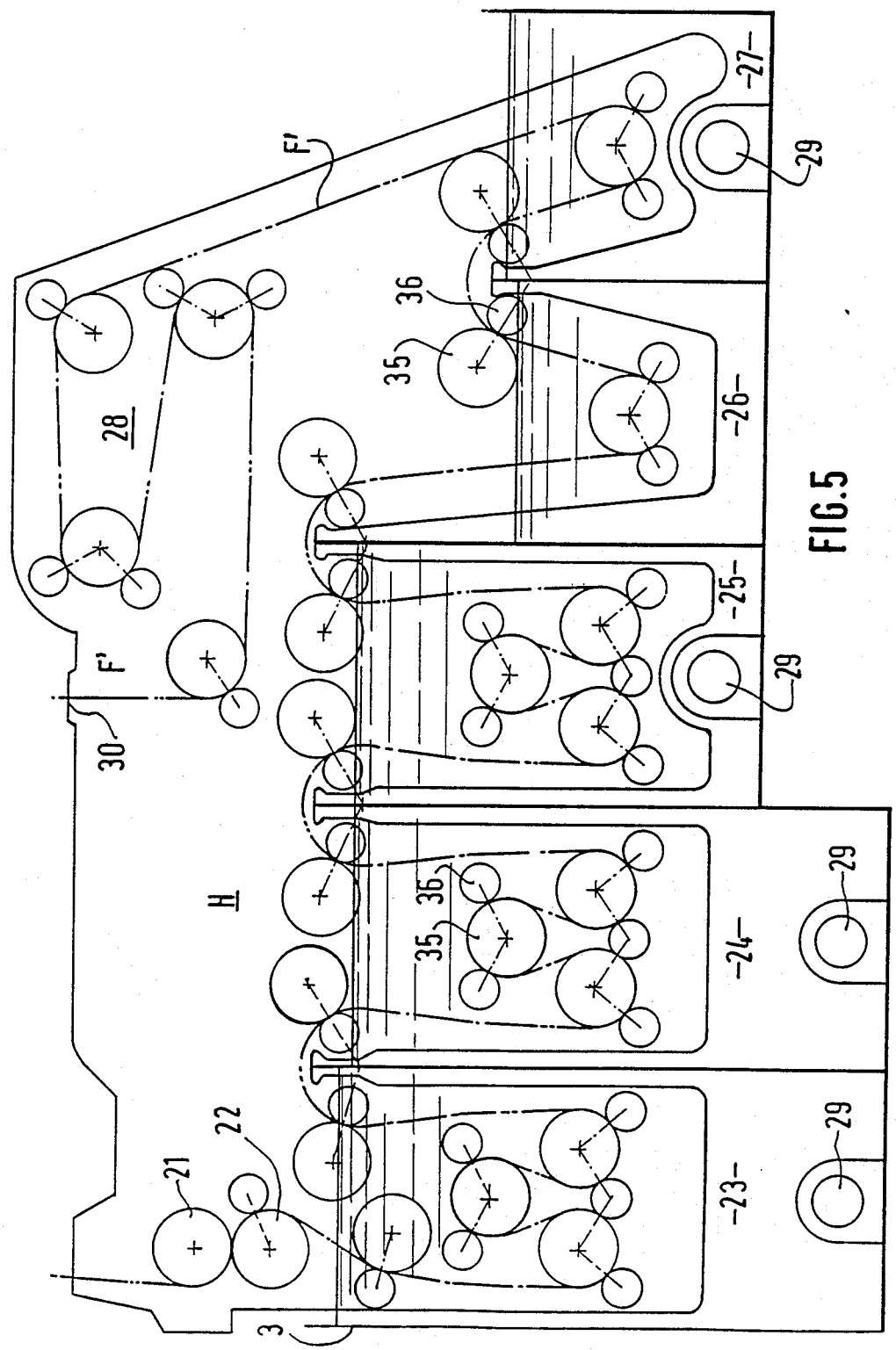
FIG. 5 is a view in longitudinal section of the film development section, taken on the axis V—V' in FIG. 3.
Figure 8:
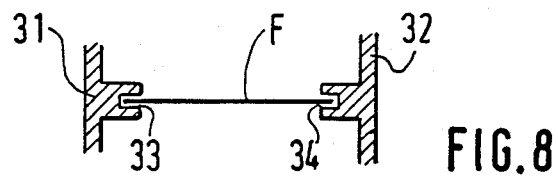
FIG. 8 is a detailed view of the film guide rails of the development section.
Figure 10:
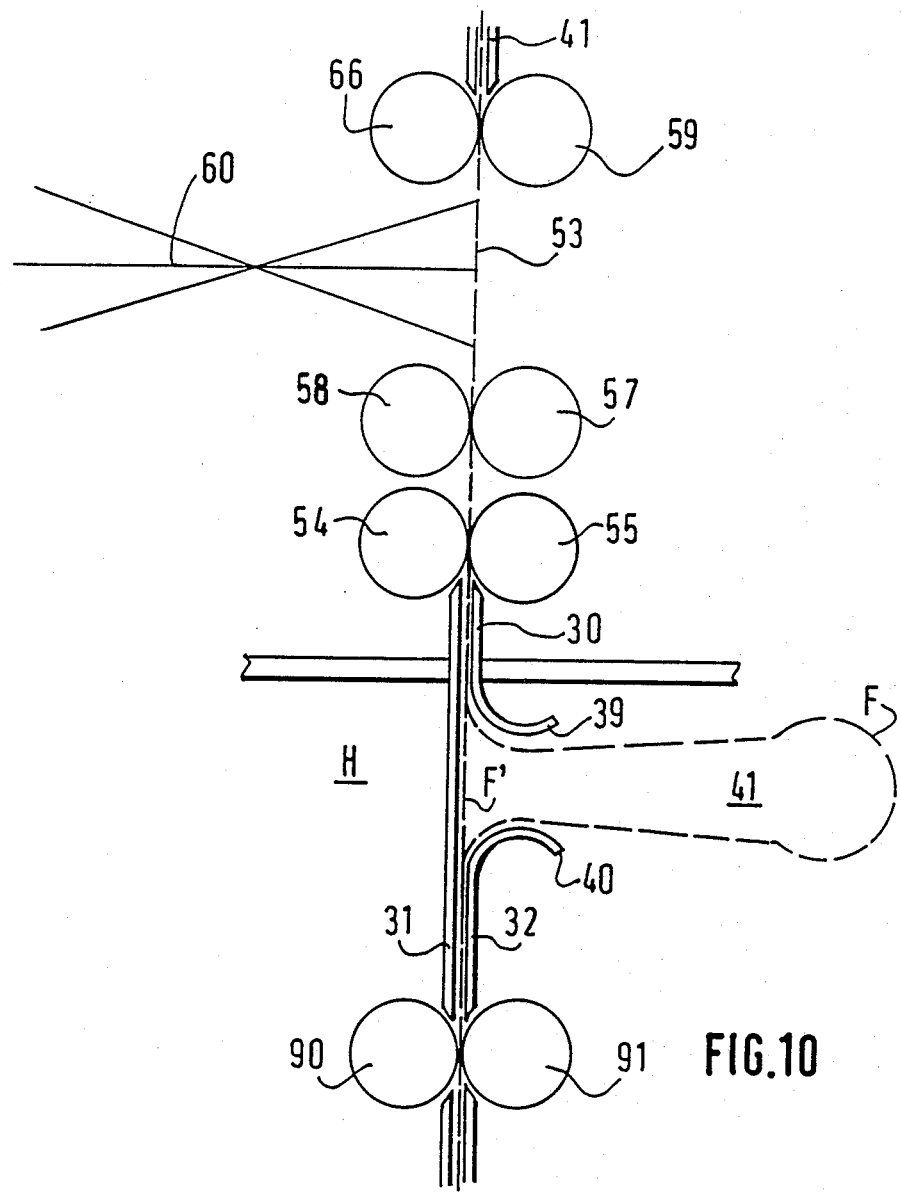
FIG. 10 is a summary schematic representation of the outlet section for the developed film F', penetrating into the negative carrier of the exposure section C.

By way of a pair of grooves, shown in detail in FIGS. 8 and 10, the film F pulled by motorized rollers 21, 22 penetrates into the film development section H of the film development unit A in the container 3 shown in detail in FIGS. 2, 4 and 5. This film development section, given the general reference H, consists in known manner of a plurality of successive tanks 23 to 27 and is followed by a drying section 28. Each tank 23 to 27 is filled with suitable liquid chemical products, for example type "C41", heated by electrical resistors 29 to the desired temperature. These tanks are, in order:

a tank 23 for the film developer.
a tank 24 for the bleach bath.
a tank 25 for the fixer.
a tank 26 for the first washing bath (or stabilizing).
a tank 27 for the second washing bath.

According to one characteristic of the invention the clean washing liquid is fed into the second tank 27 and by way of an overflow passes into the first tank 26, thus always ensuring perfect counterflow washing.

The developed film F' then penetrates into the drying zone 28, wherein is subjected to the action of a heater fan 29 (see FIG. 4).

According to one essential characteristic of the invention the dried developed film F' passes out vertically from the film development unit A through a slot, then penetrating directly into the exposure section C of the paper printing unit B disposed in the dark just above the film development section H.

Figure 9:
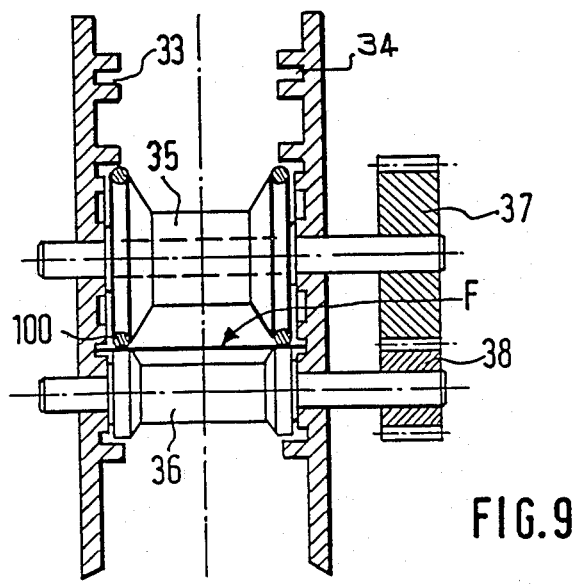
FIG. 9 shows in detail a film drive means in this development section.

In the film development section H the film F (see FIGS. 8, 9, 10) is guided between two parallel rails 31 and 32 provided with respective grooves 33, 34 disposed face to face in the same plane and spaced apart by a distance equal to the width of the film F to be developed. The movement of the film F through this section H, and more precisely in the single rack intended to be introduced into the successive tanks 23 to 27, is achieved with the aid of pairs of successive motorized pressure rollers 35, 36 driven by pinions 37, 38. The whole arrangement is driven by a single motor (not shown) and by sets of transmission means. One of the two rollers, the roller 36 in the present case, has at each of its two ends an 0-ring seal 100 which grips the film F against the edges of the other roller 35, outside the exposed zone of the film. This 0-ring 100 ensures constant, regular and uniform pressure and is easily replaced.

In order to permit exposure of the dried developed film F′ in the exposure section C (see FIG. 10), it is necessary for the continuously advancing film F′ to be stored temporarily during the exposure phase. For this purpose, just before the outlet 30 of the section H the two guide rails 31, 32 are interrupted, at least on one side, to form two bends 39, 40, thus defining between them a loop-shaped accumulation zone 41, taking advantage of the flexibility of the film F′. As already stated, the film is driven continuously, whereas the frame being exposed is stationary, so that it forms a stored loop 41 through the driving action of the last pair of rollers (90,91) of the developing unit H, while for the exposure the others pairs 57, 58, 59 and 66 are halted.

Figure 1:
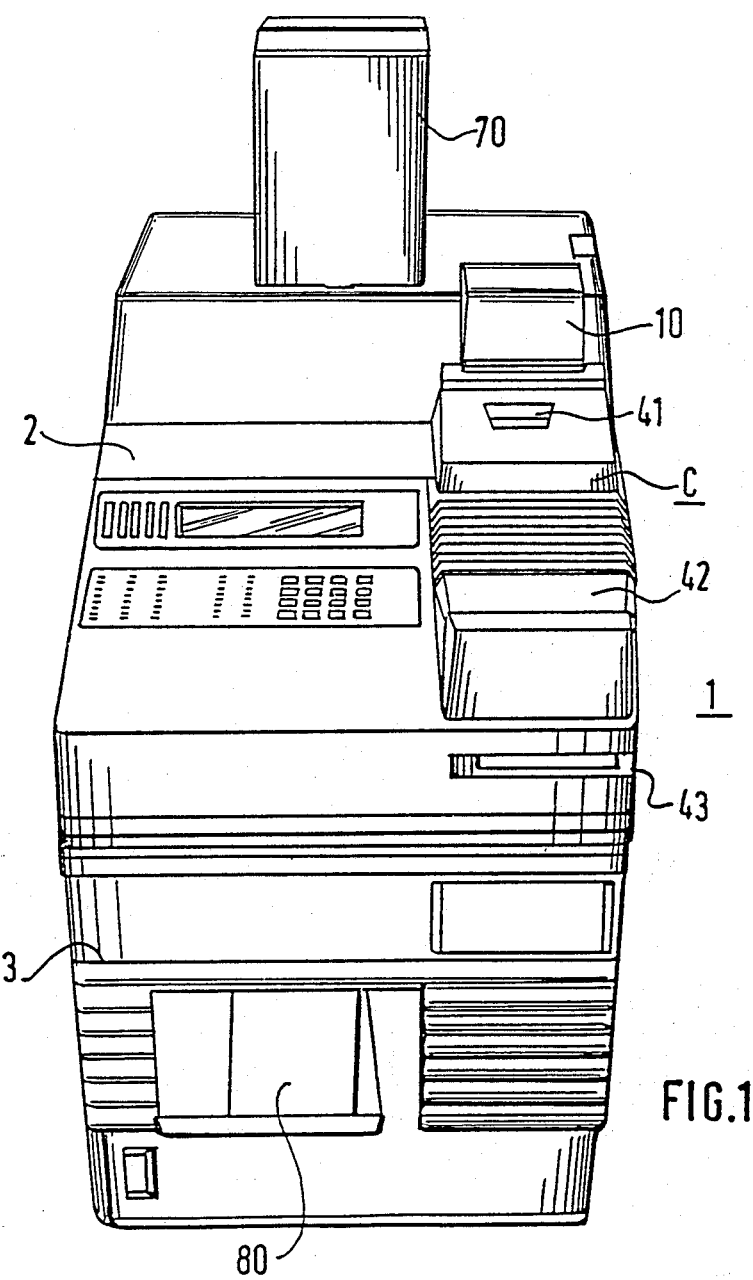
FIG. 1 shows in perspective, viewed from the front and from above, a machine according to the invention.

According to another characteristic of the invention the dried developed film F′, which advances vertically from the slot 30, then penetrates into the negative carrier of the exposure section C, thence passes out again through the slot 41 provided for the purpose in the top of the casing 1, more precisely in the lid 2 (FIG. 1).

Figure 11:
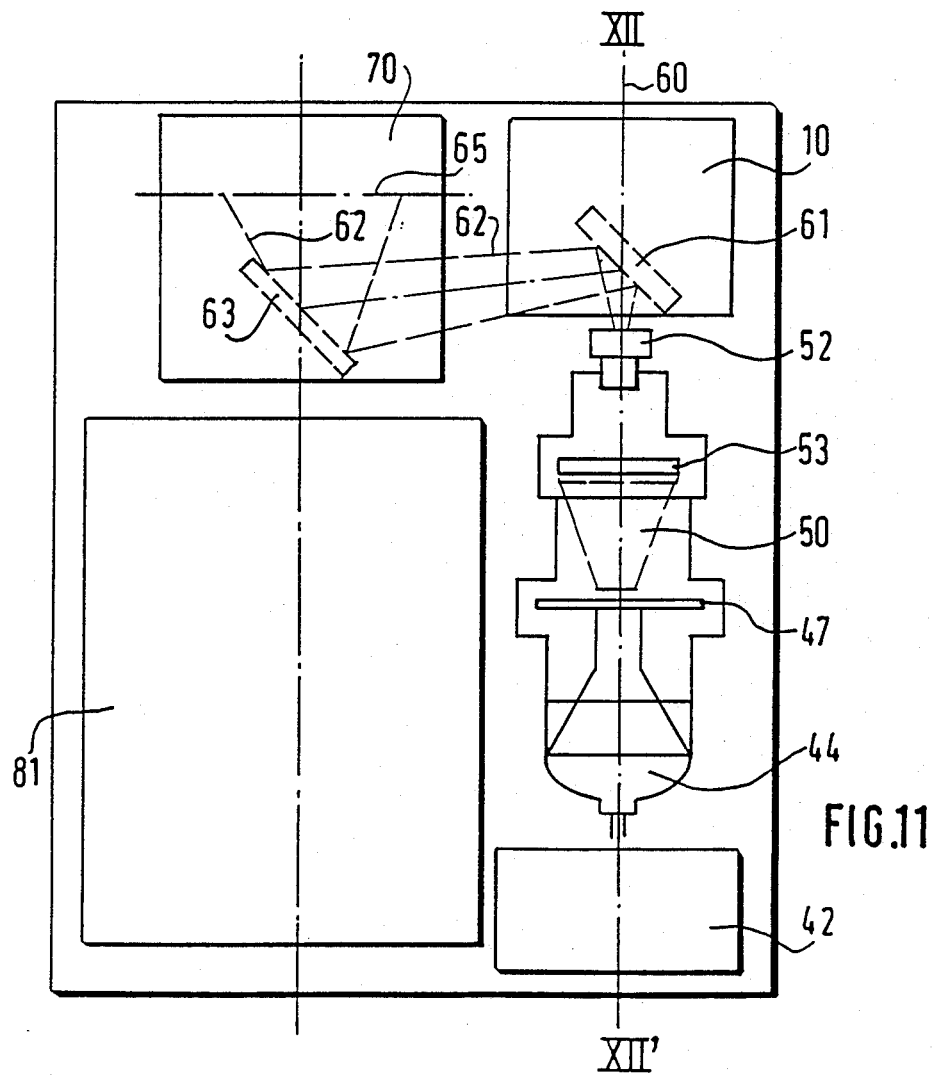
FIG. 11 is a view from above of the machine, in cross-section on the axis XI—XI' in FIG. 3.

The exposure section C of the paper printing and development unit B, as already stated, is disposed in the dark substantially above the film development unit A. This exposure section C comprises essentially, in order (see FIGS. 4, 11 and 12):

a densitometer 42, access to which can be gained via a slot 43;
an exposure lamp 44, for example of the 75 Watt halogen type with elliptical reflector;
a condenser 45;
an infrared filter 46;
filter holder disc 47 rotated by a step-by-step motor 48, which in turn is controlled by the electronic control board 81;
a second condenser 49;
a mixing prism 50 with outlet diffuser 51;
a lens 52.

The reference 53 designates the frame of the film F′ which is to be reproduced, positioned in the negative carrier of the exposure section C.

This negative carrier system (see FIGS. 4 and 12) comprises essentially three pairs of motorized pressure rollers driven synchronously and controlled by the electronic board 81, namely respectively:
a first introduction and safety pair 54, 55;
a second drive pair 56, 57;
a third extraction pair 59 66.

The reference 60 designates the optical axis for the exposure of the negative film 53 which is to be reproduced.

Figure 12:
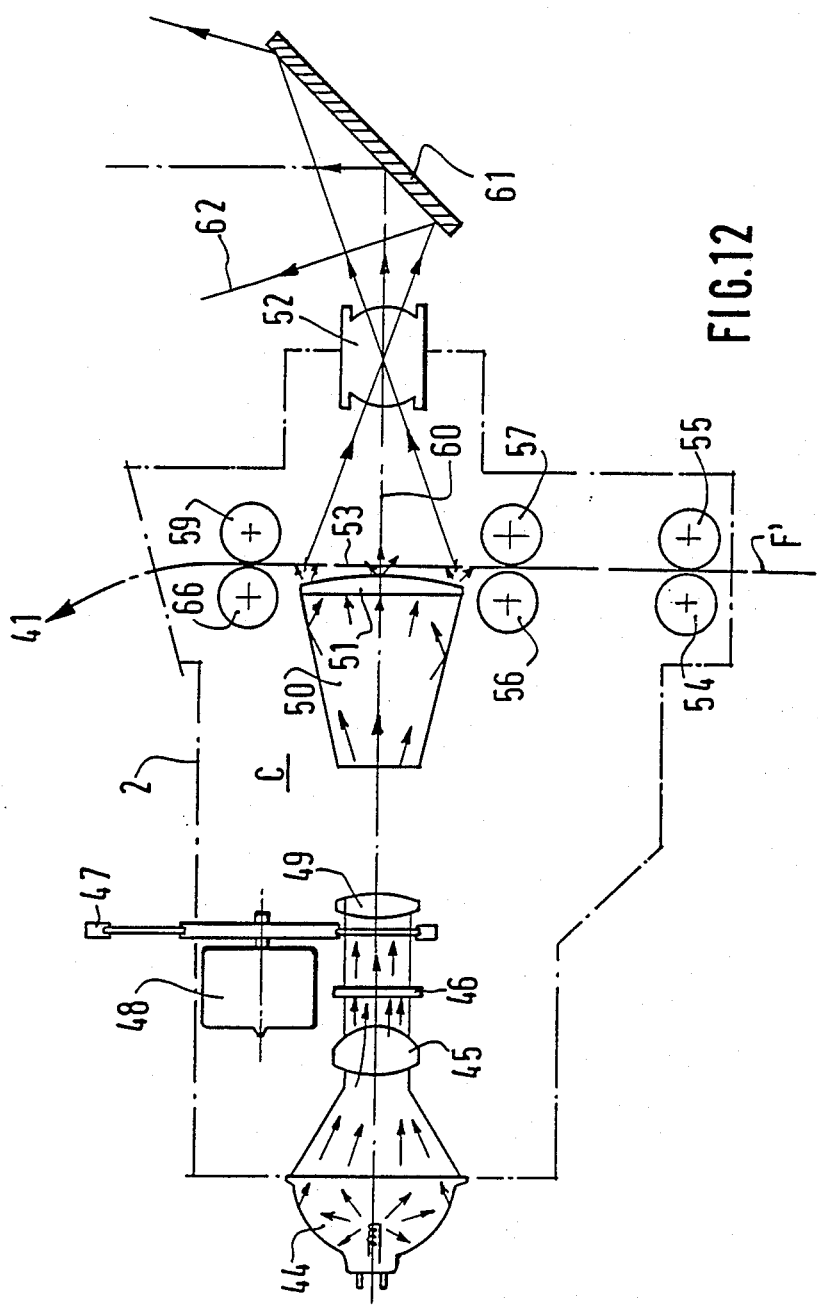
FIG. 12 is finally a detailed view in longitudinal section on the axis XII—XII' in FIG. 11.

The light beam coming from the lens 52 encounters in a straight line a first mirror 61 inclined at an angle of 45° in relation to said optical axis 60. This mirror 61 is also disposed above the film development section H. In order to facilitate understanding, this mirror 61 is schematically shown in FIG. 12 in an exaggerated position. It will however easily be realized that this mirror 61 must be disposed in the positions shown in FIGS. 2 and 11. This mirror 61 is of a known type. It is in particular an optical mirror, that is to say one having an external reflecting face covered with a coating of tin. In an improved version this mirror 61 may be slightly adjustable in respect of its inclination in order to permit better optical centering.

Figure 6:
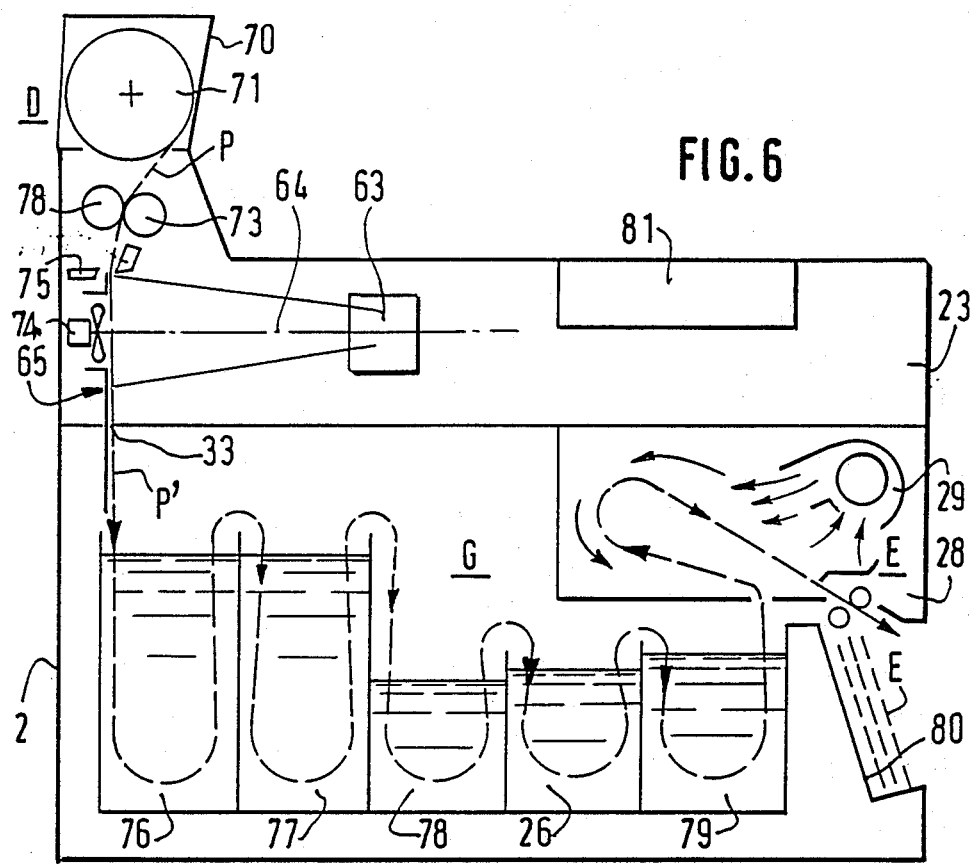
FIG. 6 is a summary view in longitudinal section of the paper printing and development unit, taken on the axis VI—VI' in FIG. 2.

According to one of the fundamental characteristics of the invention, the optical beam 62 reflected by the first mirror 61 is received by a second mirror 63, which is parallel to the first but disposed above the development section G of the printing unit B, this section being shown in detail in FIG. 6. This second mirror 63 is fixed, but is preadjusted in accordance with the selected enlargement size.

The image 64 to be reproduced, reflected by the second mirror 63, is received on the exposure surface 65 of the feed section D of the unit B.

Figure 7:
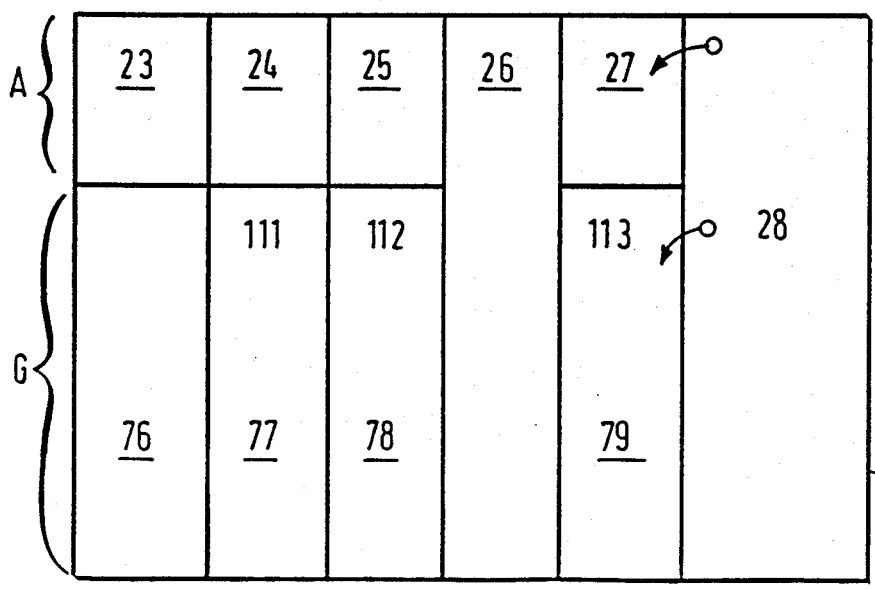
FIG. 7 shows in cross-section the container holding side by side the films development section H and the paper development section G, taken on the axis VII—VII' in FIG. 3.

According to a fundamental characteristic of the invention (see FIGS. 2, 7 and 11) the film development unit A and the development section G of the paper unit B are disposed side by side in the container 2, so that some of the chemical treatment tanks and also the drying zones lie side by side but are in separate compartments.

The feed section D of the unit B contains in known manner a cassette 70 intended to receive the roll 71 of photosensitive paper P. This paper P is driven by a pair of motorized rollers 72, 73 and is then applied against the exposure surface 65 by a fan 74. A cutter 75 cuts the appropriate length of exposed paper P′.

Once it has been exposed, the cut paper P′ falls through gravity (FIG. 6) into the paper development section G, which in known manner comprises in order:
a tank 76 intended to hold the developer.
a tank 77 intended to hold the liquid bleaching and fixing composition.
three washing Or stabilizing tanks 78, 26, ,9.

According to another characteristic of the invention (FIG. 7), the first washing tank 26 of the film development section and the second washing tank of the paper development section G are one and the same. Similarly, the drying section 28 is common to these two sections H and G. In practice, in the film development section H the tanks 23 to 27 receive a single rack, in which the film F to be developed progressively advances, while in the paper development section G the tanks 76, 77 receive two separate racks, whereas the other successive tanks 78, 26, 79 each receive one rack. Similarly, as already stated, the tanks are each filled with an appropriate chemical composition depending on the treatment required, such as for example a composition C 41 for the section H or a so-called "fast" type chemical "Kodak "RA$_4$" for the section G.

The developed photographic print E is received through the action of gravity in a reception tank 80 provided for the purpose at the front of the casing 1. An electronic control board 81 automatically controls all the components of the machine.

The machine according to the invention offers numerous advantages over the machines listed in the preamble, particularly the machine described in American Patent US-A-4 185 912. Mention may be made of:
compactness,
simplicity of mechanical construction, and therefore the possibility of production at low cost, that is to say on an industrial scale, simplicity of operation by unskilled personnel,
perfect adaptation to standard sizes.

This machine can thus be used successfully for the integrated automatic development of photographic prints from negative films.

I claim:

1. A integrated automatic machine for simultaneously and continuously effecting the development of photographic films F and the printing and development of photographic prints E, of the type comprising in a single casing (1):
   a unit A for developing negative films, consisting of a film development section H comprising a plurality of successive chemical treatment tanks (23 - 27) through which the negative film F advances, and of a drying zone (28) for the developed film F';
   a printing and development unit B for photographic prints E, comprising:
   an exposure section C, comprising a lamp (44), a filter system (47), a negative carrier (54-59), and a lens (52);
   a paper feed section D comprising a packet (70) of photosensitive paper P, a means (72, 73) bringing the paper P to an exposure surface (65) onto which the image (64) to be reproduced, coming from the lens (52), is projected, and a means (75) for cutting the exposed paper P';
   a development section G for the exposed paper P', comprising a plurality of successive chemical treatment tanks (76 - 79) and a zone for drying the resulting photographic print E,
   characterized
   in that the film development section H of the unit A and the paper development section G of the unit B are disposed side by side, so that some of the chemical treatment tanks (23-27, 76-79) and the drying zones (28) are disposed side by side in separate compartments;
   in that the exposure section C of the printing unit B is disposed in the dark above the film development section H, while the feed section P following it is disposed above the paper development section G;
   in that the developed film F' passes out in the dark from the film development section H to penetrate directly into the negative carrier (54-59) of the exposure section C disposed above the film development section H;
   and in that the image (62,64) to be reproduced, coming from the lens (52) disposed after the negative carrier, is received by a first mirror (61) disposed in the exposure section C above the film development section H, and is then transmitted by reflection (62) onto a second mirror (63) parallel to the first mirror (61) but disposed above the paper development section G, to bring this image (64) onto the exposure surface (65) of the paper feed section D.

2. A machine according to claim 1, characterized in that the drying zone (28) and at least one of the washing tanks (26) of the two development sections H and G for film and paper respectively are common to the two units A and B.

3. A machine according to claim 1, characterized in that in the film development section H the guide system for the negative film F comprises two parallel guide rails (31,32) provided with respective grooves (33,34) facing one another in the same plane and spaced apart by a distance equal to the width of the film F to be developed, the film F being transported in this section H by pairs of motorized rollers (35,36), at least one of which rollers has at both ends an 0-ring seal (100) disposed facing and pressing against the other roller (36), in such a manner as to grip, outside the exposed zone, the film F which is to be transported.

4. A machine according to claim 1, characterized in that the exposure section C comprises:
   first module disposed above the film development section H and consisting of an exposure lamp (44), a filter system (47), a diffusing system (50), the outlet end (30) of the two guide rails (31,32) for the developed film F' forming a negative carrier, a pair of drive rollers (57-59) intended for driving the developed film F', a lens (52), and a first mirror (61) inclined at 45° and intended for reflecting the image (53) of the exposed film;
   a second module disposed above the paper development section G and consisting of a second mirror (63) parallel to the first and intended for reflecting the image (64) to be reproduced onto the exposure surface (65).

5. A machine according to claim 1, characterized in that that portion of the rails (31,32) guiding the film F in the section H which lies just upstream of the outlet (30) is interrupted at least on one side in such a manner as to form, taking advantage of the flexibility of the film F, an accumulation zone (41) for the developed film F', which advances continuously, whereas the image (53) being exposed in the exposure section C is stationary.

6. A machine according to claim 5, characterized in that the system driving the developed film F' to be exposed comprises three pairs of synchronously driven pressure rollers whose planes of tangency are in alignment, the first pair (54,55) and the second pair (57,58) defining a zone disposed just upstream of the exposure window and intended to receive the negative film analysis system, the said second pair 57,58) and third pair (59,66) being disposed on the optical path (60) in order to form the negative carrier.

* * * * *

UNITED STATES PATENT AND TRADEMARK OFFICE

Certificate

Patent No.: 4,864,354                                      Patented: Sept. 5, 1989

On petition requesting issuance of a certificate of correction of inventorship pursuant to 35 USC 256, it has been found that the above-identified patent, through error and without any deceptive intent, improperly sets forth the inventorship. Accordingly, it is hereby certified that the correct inventorship of this patent is:
Serge Crasnianski and Philippe Combet.

Signed and Sealed this Seventeenth Day of April, 1990.

L. T. HIX

*Supervisory Patent Examiner*
*Art Unit 211*